United States Patent
Newberg et al.

(10) Patent No.: US 11,446,670 B2
(45) Date of Patent: Sep. 20, 2022

(54) ADJUSTABLE SLIDE STAGE FOR DIFFERENTLY SIZED SLIDES

(71) Applicant: Leica Biosystems Imaging, Inc., Vista, CA (US)

(72) Inventors: Nick Newberg, San Marcos, CA (US); Prentash Djelosevic, Oceanside, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 306 days.

(21) Appl. No.: 16/624,005

(22) PCT Filed: Aug. 17, 2018

(86) PCT No.: PCT/US2018/046944
§ 371 (c)(1),
(2) Date: Dec. 18, 2019

(87) PCT Pub. No.: WO2019/036647
PCT Pub. Date: Feb. 21, 2019

(65) Prior Publication Data
US 2020/0197943 A1  Jun. 25, 2020

Related U.S. Application Data
(60) Provisional application No. 62/546,877, filed on Aug. 17, 2017.

(51) Int. Cl.
G02B 21/34 (2006.01)
B01L 9/00 (2006.01)
G02B 21/26 (2006.01)

(52) U.S. Cl.
CPC ............ *B01L 9/52* (2013.01); *G02B 21/26* (2013.01); *B01L 2200/023* (2013.01); *B01L 2300/0822* (2013.01)

(58) Field of Classification Search
CPC .......... G02B 21/26; G02B 21/34; B01L 9/52; B01L 2200/023; B01L 2300/0822
See application file for complete search history.

(56) References Cited

U.S. PATENT DOCUMENTS

| 4,012,111 A | * | 3/1977 | Masterson | ............. | G02B 21/26 359/391 |
| 4,946,266 A | * | 8/1990 | Kraft | ...................... | G02B 21/26 269/21 |

(Continued)

FOREIGN PATENT DOCUMENTS

| CN | 104730700 A | 6/2015 |
| CN | 205246965 U | 5/2016 |

(Continued)

OTHER PUBLICATIONS

International Search Report and Written Opinion issued in International Application No. PCT/US2018/046944 dated Dec. 18, 2018 in 14 pages.

(Continued)

*Primary Examiner* — Mustak Choudhury
(74) *Attorney, Agent, or Firm* — Frost Brown Todd LLC (57) ABSTRACT

A digital slide scanning apparatus slide stage is configured to hold 1×3 and 2×3 glass slides. The slide stage is configured to alter its position by lateral shift or rotation to present the 1×3 or 2×3 sized recess to a slide rack for loading of the slide onto the stage. Also, a removable insert may configure the stage to hold a 1×3 glass slide when present and to hold a 2×3 glass slide when removed. Alternatively, a gripper stage is described herein that includes a fixed arm and a movable arm, each with one or more contact points configured to engage a side surface of the glass slide. Once the glass slide is secured between the contact points of the (Continued)

movable arm and the contact points of the fixed arm, the slide is further processed for scanning.

11 Claims, 5 Drawing Sheets

(56) References Cited

U.S. PATENT DOCUMENTS

| | | | |
|---|---|---|---|
| 7,403,330 | B2 | 8/2008 | Henderson et al. |
| 8,902,501 | B2 | 12/2014 | Suzuki et al. |
| 2006/0198764 | A1* | 9/2006 | Zimmermann ........ G02B 21/34 422/536 |
| 2008/0261826 | A1 | 10/2008 | Kronick et al. |
| 2013/0259773 | A1 | 10/2013 | Kubek |
| 2015/0177504 | A1 | 6/2015 | Bickert |
| 2015/0346476 | A1 | 12/2015 | Quarre et al. |
| 2017/0146783 | A1 | 5/2017 | Lundin |

FOREIGN PATENT DOCUMENTS

| | | |
|---|---|---|
| CN | 106415356 A | 2/2017 |
| JP | 60-044019 | 3/1985 |
| JP | 60-049314 | 3/1985 |
| JP | S60-49314 U | 4/1985 |
| JP | 2001-100508 A | 4/2001 |
| JP | 2006-242951 A | 9/2006 |
| JP | 2017-072731 A | 4/2017 |
| JP | 2020-525848 A | 8/2020 |
| WO | WO 2015/077837 A1 | 6/2015 |
| WO | WO 2019/036647 A1 | 2/2019 |

OTHER PUBLICATIONS

International Preliminary Report on Patentability for related International Application No. PCT/US2018/046944 dated Jan. 2, 2020, in 13 pages.
Office Action in Chinese Application No. 201880042587.9 dated Apr. 1, 2021, in 15 pages.
Office Action in Chinese Application No. 201880042587.9 dated Sep. 22, 2021, in 14 pages.
Notice of Allowance in Chinese Application No. 201880042587.9 dated Jan. 13, 2022, in 9 pages.
Extended European Search Report dated Jan. 11, 2021 for European App No. 18846053.9, in 8 pages.
Office Action in Japanese Application No. 2019572590 dated Dec. 24, 2020, in 10 pages.
Written Opinion in Japanese Application No. 2019572590 dated Apr. 1, 2021, in 4 pages.
Notice of Allowance in Japanese Application No. 2019572590 dated Sep. 28, 2021, in 5 pages.

* cited by examiner

FIG. 4 (TOP VIEW)

ADJUSTABLE SLIDE STAGE FOR DIFFERENTLY SIZED SLIDES

CROSS-REFERENCE TO RELATED APPLICATIONS

This application claims priority to U.S. Provisional Patent App. No. 62/546,877, filed on Aug. 17, 2017—the entirety of which is hereby incorporated herein by reference.

BACKGROUND

Field of the Invention

The present invention relates generally to a digital pathology scanning apparatus, and, more particularly, to a scanning stage that supports variable-sized slides or slide racks.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine, in order to achieve even better, faster and cheaper diagnoses, prognoses, and predictions of cancer and other important diseases.

The majority of physical glass slides are 76×26 mm (1×3). However, some glass slides are 76×52 mm (2×3). These larger glass slides are sometimes referred to as "double-wide." A digital slide scanning apparatus typically scans a single slide at a time. Some digital slide scanning apparatus are dedicated to scanning 1×3 slides and other digital slide scanning apparatus are dedicated to scanning 2×3 slides. However, the conventional digital slide scanning processes typically separate the processing of 1×3 slides from the processing of 2×3 slides, due to the different scanning equipment that is required for processing the differently sized slides. Therefore, what is needed is a system and method that overcomes these significant problems found in the conventional systems as described above.

SUMMARY

Accordingly, described herein is a slide stage for use with a digital slide scanning apparatus that is configured to hold individual glass slides of varying sizes. A single slide stage includes a dedicated recess for a 1×3 slide and a separate dedicated recess for a 2×3 slide. The slide stage is configured to alter its position to present the appropriately sized recess to the slide rack from which a glass slide will be loaded onto the slide stage. Altering its position may be accomplished by a lateral shift or by a rotation. Alternatively, the slide stage may include a removable insert such that when the insert is present, the slide stage is configured to hold a 1×3 glass slide and, when the insert is removed, the slide stage is configured to hold a 2×3 glass slide.

In an alternative embodiment, a gripper stage is described herein that includes a fixed arm and a movable arm. The movable arm is configured to move toward and away from the fixed arm to provide a variable-width slide holder. The fixed arm includes one or more contact points configured to engage a side surface of a glass slide and a lower support configured to engage at least a portion of a bottom surface of the glass slide. The movable arm also includes one or more contact points configured to engage a side surface of a glass slide and a lower support configured to engage at least a portion of a bottom surface of the glass slide. The movable arm opens by moving away from the fixed arm and subsequent to the slide being pushed partially out of the slide rack. The gripper stage brings the fixed arm contact points adjacent a side of the glass slide, and the movable arm closes until the one or more contact points of the movable arm engage a side surface of the glass slide and press the opposing side surface of the glass slide into the one or more contact points on the fixed arm. Once the glass slide is secured between the one or more contact points of the movable arm and the one or more contact points of the fixed arm, the slide is pulled the rest of the way out of the slide rack and further processed for scanning.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a slide stage for scanning 1×3 and 2×3 glass slides. The slide stage is configured to alter is position to present a 1×3 or 2×3 slide recess to a slide rack for unloading of a glass slide onto the scanning stage. The slide stage may also be configured to move a removable insert to present a 1×3 or 2×3 slide recess to a slide rack for unloading of a glass slide onto the scanning stage. Other embodiments disclosed herein provide for a gripper slide stage that is configured to engage opposing side surfaces of the glass slide to secure the glass slide for scanning. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
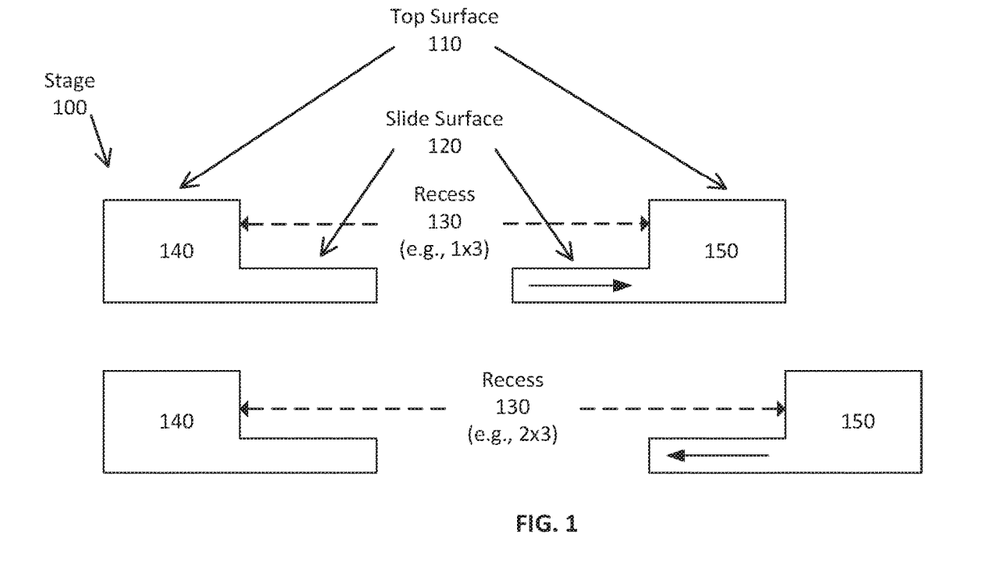
FIG. 1 is a block diagram illustrating an example scanning stage configured to hold a 1×3 glass slide or a 2×3 glass slide, according to an embodiment of the invention.

FIG. 1 is a block diagram illustrating an example scanning stage that is capable of being adjusted to hold either a 1×3 glass slide or a 2×3 glass slide, according to an embodiment. In the illustrated embodiment, the scanning stage 100 has as top surface 110 and a slide surface 120 that is recessed from the top surface 110. The scanning stage comprises one fixed portion 140 and one movable portion 150, with a recess 130 defined between the side surfaces of the fixed portion 140 and movable portion 150 and above the slide surfaces 120 of the fixed portion 140 and movable portion 150. The movable portion 150 is configured to move toward or away from the fixed portion 140 to thereby change the size of the recess 130 between the two portions 140 and 150, by changing a distance between the side surfaces of the two portions 140 and 150. This allows the scanning stage to be reconfigured to accept differently sized glass slides, such as a 1×3 slide in a first configuration and a 2×3 slide in a second configuration. Additional slide sizes may also be accommodated.

Figure 2:
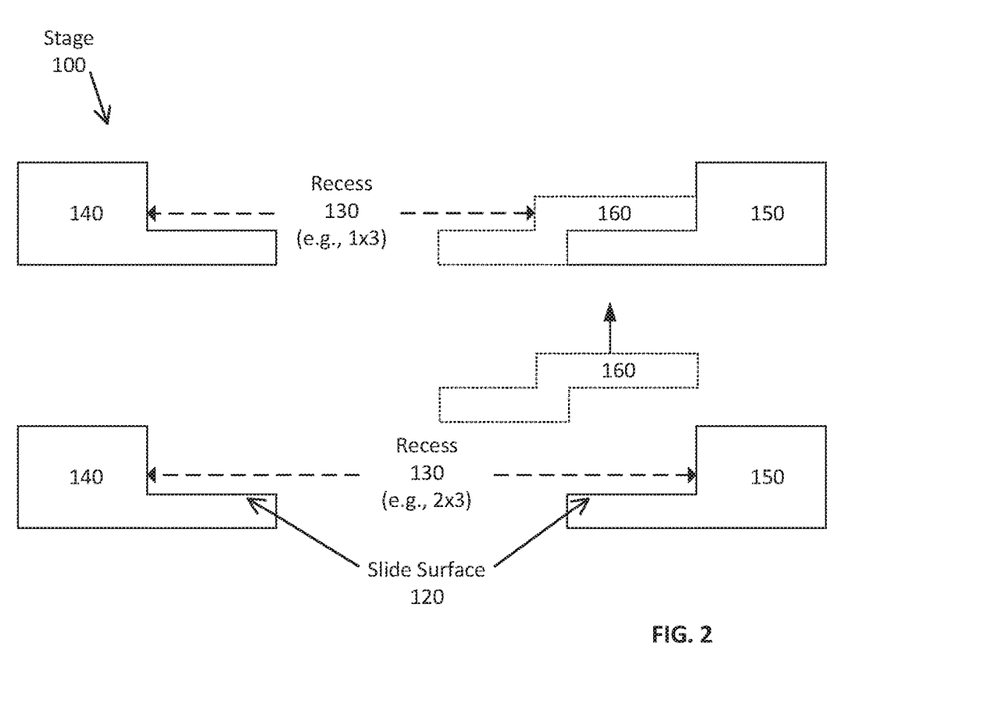
FIG. 2 is a block diagram illustrating an example scanning stage with a removable insert configured to hold a 1×3 glass slide or a 2×3 glass slide, according to an embodiment of the invention.

FIG. 2 is a block diagram illustrating an example scanning stage that is capable of being adjusted to hold a 1×3 glass slide or a 2×3 glass slide, using a movable (e.g., removable) insert, according to an embodiment. The scanning stage 100 may comprise two fixed portions 140 and 150 that define a 2×3 sized recess 130 between their two side surfaces and above their respective slide surfaces 120. A movable insert 160 can be placed adjacent to one of the fixed portions 150 to reduce the size of the recess 130, by filling in a portion of the recess 130 that is adjacent to the side surface of the fixed portion 150. In the illustrated embodiment, the movable insert 160 is placed over the slide surface 120 of the fixed portion 150, such that the size of the movable insert 160 changes the size of the recess 130 from a 2×3 sized recess to a 1×3 sized recess. Plural movable inserts 160 of different sizes (e.g., different lengths with respect to recess 130) may be employed to provide varying recess sizes. In either case, it should be understand that a movable insert 160 may be removable (e.g., separable from the scanning stage 100), or may be movable while remaining connected to the scanning stage 100 (e.g., via mechanical attachment, such as a rail, hinge, etc.).

Figure 3:
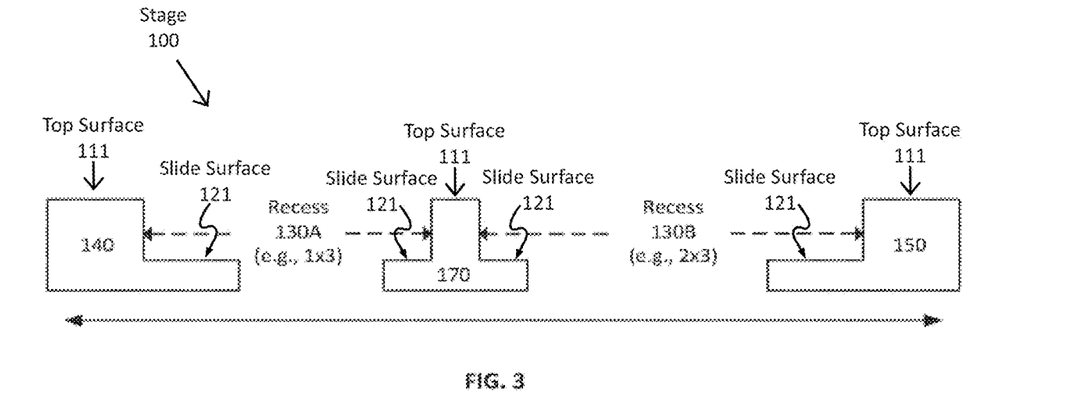
FIG. 3 is a block diagram illustrating an example scanning stage configured to hold a 1×3 glass slide or a 2×3 glass slide, according to an embodiment of the invention.

FIG. 3 is a block diagram illustrating an example scanning stage that is capable of being adjusted to receive a 1×3 glass slide or a 2×3 glass slide, according to an embodiment. In the illustrated embodiment, the scanning stage includes two fixed-size recesses 130A and 130B. The first fixed-size recess 130A is formed between the side surfaces of the portion 140 and a middle portion 170 of the scanning stage 100, and the second fixed-size recess 130B is formed between the side surfaces of the middle portion 170 and the portion 150. The first fixed-size recess 130A is sized to accommodate a 1×3 glass slide, and the second fixed-size recess 130B is sized to accommodate a 2×3 glass slide. In each case, the glass slide can be positioned on slide surfaces 121, which are recessed below top surfaces 111. The entire slide stage 100 (i.e., portions 140, 150, and 170) is configured to move to present either the 1×3 recess 130A or the 2×3 recess 130B for receiving a glass slide prior to scanning. For example, the stage may move laterally to align one of recesses 130A and 130B with an opening for receiving the glass slide or to place one of the recesses 130A and 130B into a position for scanning. Alternatively, the recesses 130A and 130B may be vertically stacked, and the stage 100 may move up and down to align one of the recesses 130A and 130B with an opening for receiving the glass slide or to place one of the recesses 130A and 130B into a position for scanning.

Figure 4:
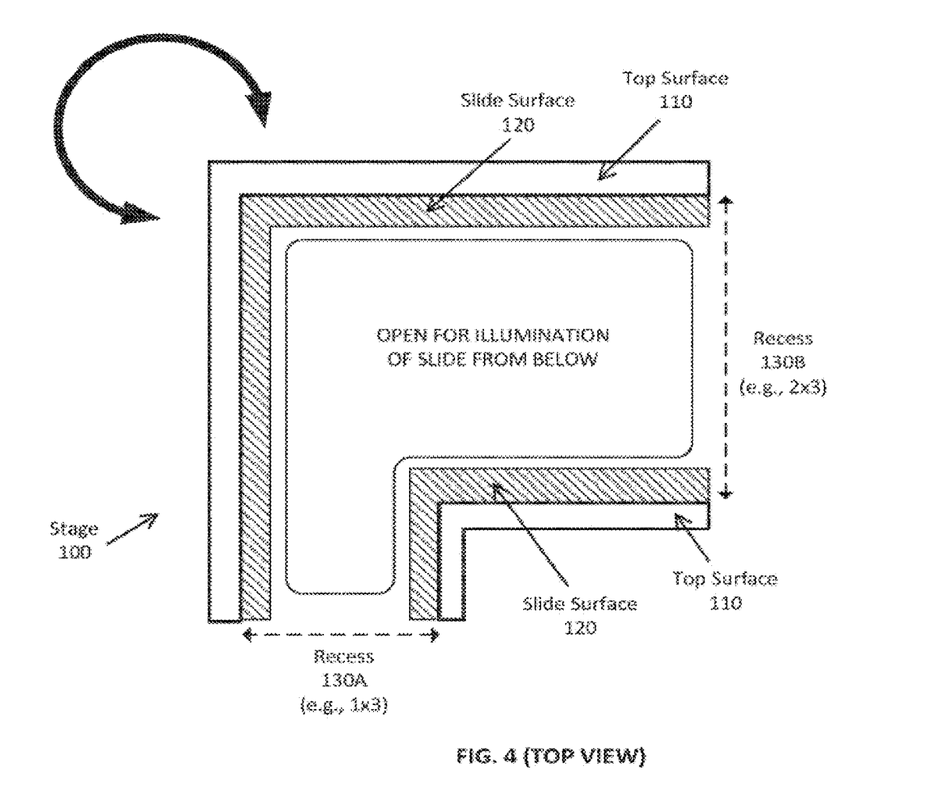
FIG. 4 is a block diagram illustrating an example scanning stage configured to hold a 1×3 glass slide or a 2×3 glass slide, according to an embodiment of the invention.

FIG. 4 is a block diagram illustrating an example scanning stage that is capable of being adjusted to receive a 1×3 glass slide or a 2×3 glass slide, according to an embodiment. In the illustrated embodiment, the scanning stage 100 includes two fixed-size recesses 130A and 130B. A first fixed-size recess 130A accommodates a 1×3 glass slide and a second fixed-size recess 130B accommodates a 2×3 glass slide. The entire slide stage 100 is configured to move to present either the 1×3 recess 130A or the 2×3 recess 130B for receiving a glass slide prior to scanning. For example, the entire slide stage 100 may rotate, about an axis orthogonal to a plane of the recessed slide surfaces 120, to present either the 1×3 recess 130A or the 2×3 recess 130B for loading of a glass slide into the respective recess, prior to scanning the glass slide. For example, the rotation may align one of the recesses 130A and 130B with an opening for receiving the glass slide or place one of the recesses 130A and 130B into a position for scanning. As illustrated, the scanning stage 100 in this embodiment may be formed by two L-shaped portions, with the leg of each L-shaped portion being parallel to a corresponding leg of the other L-shaped portion, so as to form a single L-shaped recess having legs of different widths. In this case, this single L-shaped recess can be thought of logically as two overlapping rectangular recesses of different dimension.

Figure 5A:
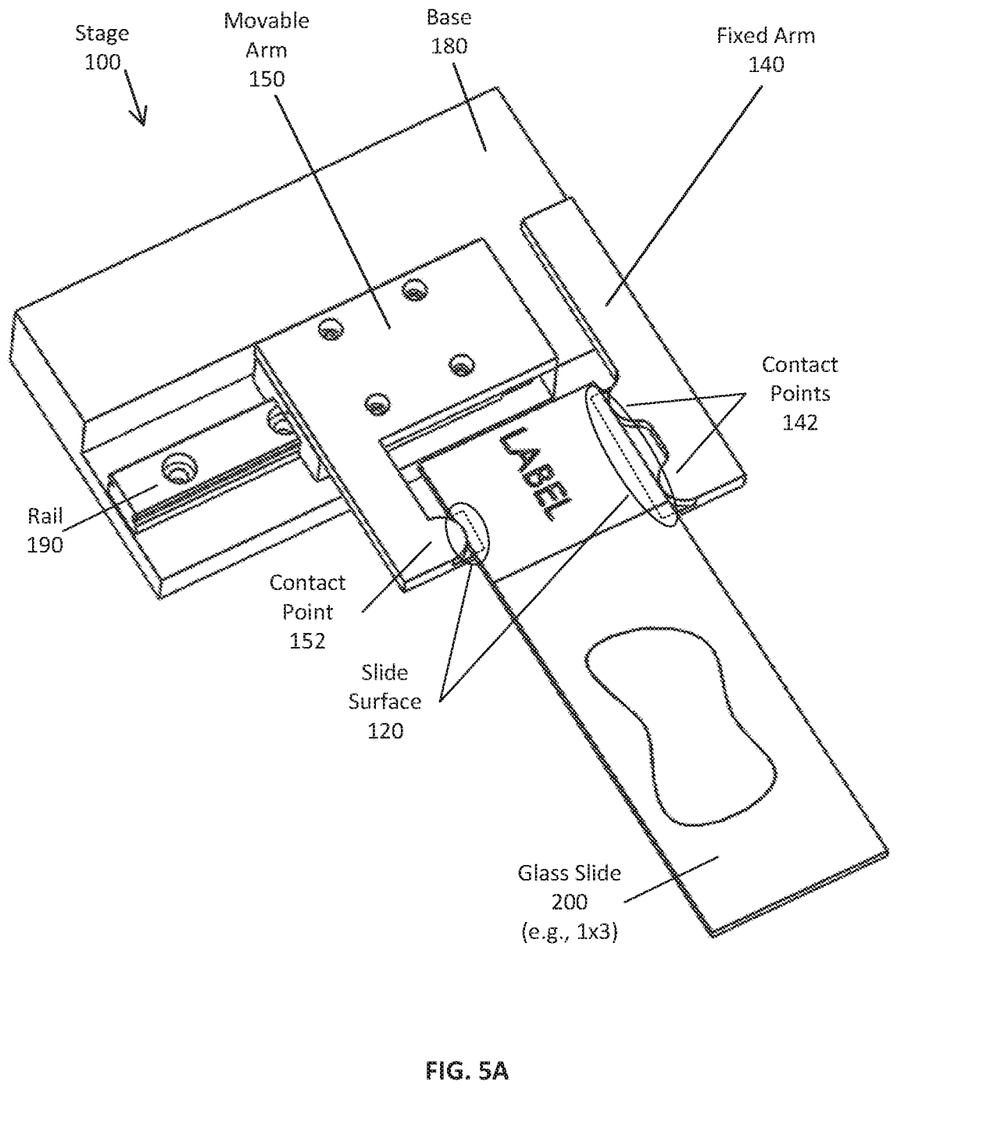
FIG. 5A is a perspective view diagram illustrating an example gripper stage configured to hold a 1×3 glass slide, according to an embodiment of the invention.
Figure 5B:
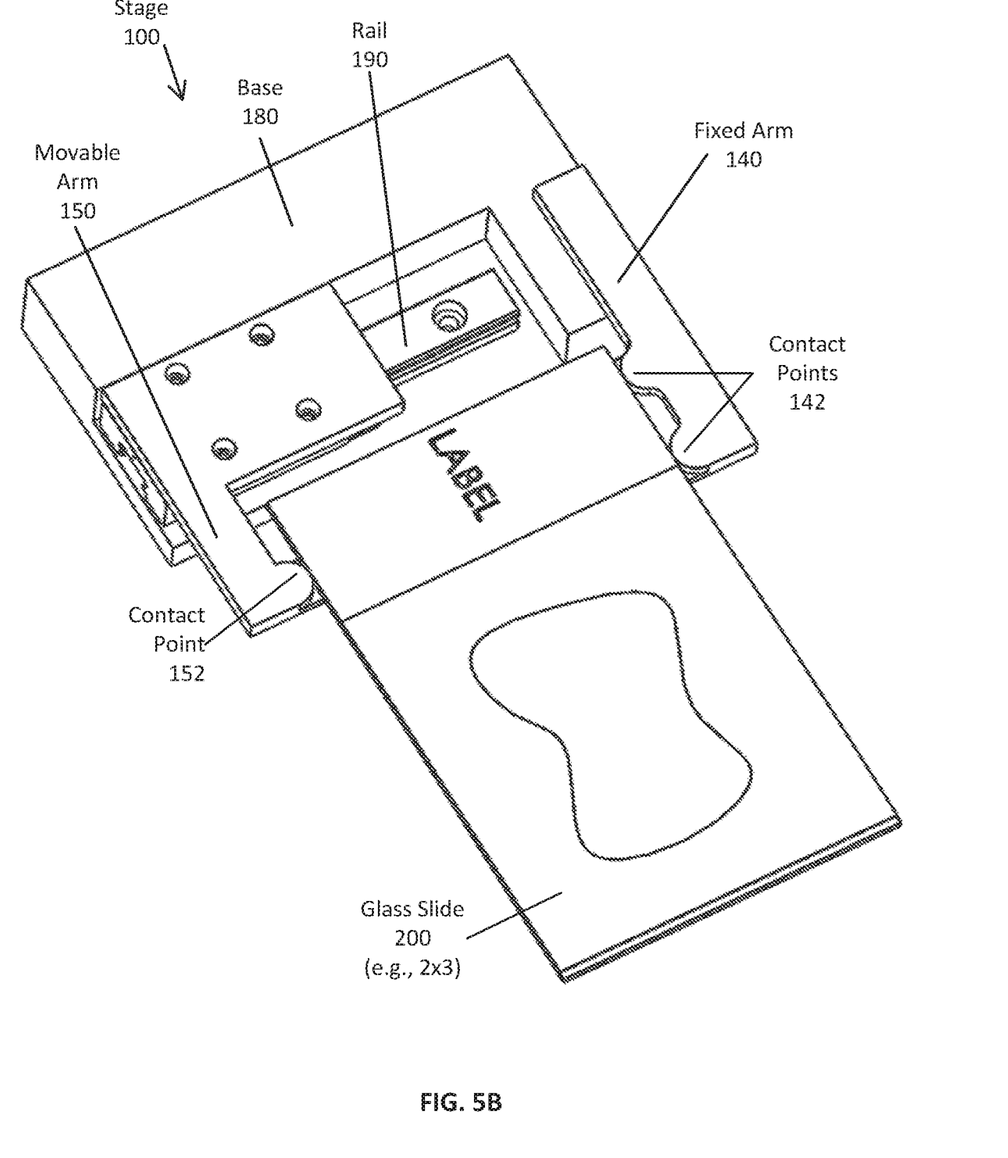
FIG. 5B is a perspective view diagram illustrating an example gripper stage configured to hold a 2×3 glass slide, according to an embodiment of the invention.

FIGS. 5A and 5B are perspective view diagrams illustrating an example gripper stage that is capable of being adjusted to hold a 1×3 glass slide (e.g., shown in FIG. 5A) or a 2×3 glass slide (e.g., shown in FIG. 5B), according to an embodiment. In the illustrated embodiment, the scanning stage 100 includes a base 180 having a rail 190 and a fixed arm 140 extending from the base 180. The fixed arm 140 has one or more contact points 142 configured to engage a side surface of the glass slide 200. The fixed arm 140 also has a slide surface 120 that comprises at least one lower support configured to engage a bottom surface of the glass slide 200.

The gripper stage also includes a movable arm 150 configured to move in a linear direction along the longitudinal axis of the rail 190 to increase the distance between the movable arm 150 and the fixed arm 140. The movable arm 150 has one or more contact points 152 configured to engage an opposing side surface of the glass slide 200. The movable arm 150 also has a slide surface 120 that comprises at least one lower support configured to engage a bottom surface of the glass slide 200. Advantageously, the movable arm 150 is configured to open and close with respect to the fixed arm 140 (i.e., increase and decrease the distance between the movable arm 150 and the fixed arm 140), such that glass slides 200 of variable size may be secured between the contact points 152 of the movable arm 150 and the contact points 142 of the fixed arm 140. In an embodiment, there are at least three total contact points 142 and 152 between the fixed arm 140 and the movable arm 150 (e.g., two on the fixed arm 140 and one on the movable arm 150).

In an embodiment, the side surface of the contact points 142 and/or 152 may be angled or curved, such that a region of the contact point nearer the bottom surface of the glass slide 200 (and also nearer the lower support of the slide surface 120) recedes away from the side surface of the glass slide 200. Accordingly, when the movable arm 150 presses the side surface of the glass slide 200 into the angled or curved side surface of the fixed arm contact point(s) 142, downward pressure is imparted on the glass slide 200 to press the bottom surface of the glass slide 200 into the lower supports of the slide surface 120 of the fixed arm 140. The one or more contact points 152 of the movable arm 150 may be similarly configured to impart downward pressure on the glass slide 200, so as to press the bottom surface of the glass slide 200 into the lower supports of the slide surface 120 of the movable arm 150.

It should be understood that, in each of the embodiments described herein, the slide surfaces may be sized, such that the slide surface of one fixed or movable portion does not adjoin the slide surface of any of the other fixed or movable portions. This allows the respective recess or recesses in each embodiment to be open from below, so that an illumination system below the scanning stage 100 may illuminate a glass slide placed within the respective recess.

EXAMPLE EMBODIMENTS

In an embodiment, a digital slide scanning stage includes a fixed portion having a top surface and a recessed slide surface below the top surface and a movable portion having a top surface and a recessed slide surface below the top surface, wherein the recessed slide surface of the movable portion is parallel to the recessed slide surface of the fixed portion. In this embodiment, the movable portion is configured to move between at least a first position and a second position. The first position defines a first recess between the fixed portion and the movable portion, the first recess configured to hold a glass slide having a first width dimension. The second position defines a second recess between the fixed portion and the movable portion, the second recess configured to hold a glass slide having a second width dimension. Additionally in this embodiment, movement of the movable portion is along a linear axis that is parallel to the recessed slide surfaces of the movable portion and the fixed portion.

In an embodiment, a digital slide scanning stage includes a first fixed portion having a first top surface and a first recessed slide surface below the top surface and a second fixed portion having a second top surface and a second recessed slide surface below the top surface. The first recessed slide surface is parallel to the second recessed slide surface and the first and second fixed portions define a first recess configured to hold a glass slide having a first width dimension. Additionally, a movable insert is configured to move between at least a first position and a second position and when the movable insert is in the first position, the movable insert is positioned at least partially adjacent the second fixed portion. The first fixed portion and the movable insert also define a second recess configured to hold a glass slide having a second width dimension.

In an embodiment, a digital slide scanning stage includes a first fixed portion (e.g., FIG. 3, portion 140) having a first top surface (e.g., FIG. 3, one of top surfaces 111) and a first recessed slide surface below the top surface (e.g., FIG. 3, one of slide surfaces 121), a second fixed portion (e.g., FIG. 3, portion 150) having a second top surface and a second recessed slide surface below the top surface, and a third fixed portion (e.g., FIG. 3, portion 170) having a third top surface and a third recessed slide surface below the top surface and a fourth recessed slide surface below the top surface. In this embodiment, the first recessed slide surface is parallel to the third recessed slide surface, and the first fixed portion and a least a portion of the third fixed portion define a first recess configured to hold a glass slide having a first width dimension. Additionally, the second recessed slide surface is parallel to the fourth recessed slide surface, and the second fixed portion and a least a portion of the third fixed portion define a second recess configured to hold a glass slide having a second width dimension. Furthermore, in one aspect of this embodiment, the first, second, and third fixed portions of the scanning stage are configured to move laterally to present one of the first recess or second recess for loading of a first glass slide into the respective recess prior to scanning of the first glass slide.

In an embodiment, a digital slide scanning stage includes a first fixed portion having a first top surface and a first recessed slide surface below the top surface, and a second fixed portion having a second top surface and a second recessed slide surface below the top surface. Additionally, each of the recessed slide surfaces is parallel to the other recessed slide surfaces and only a portion of the first recessed slide surface and only a portion of the second recessed slide surface combine to define a first recess configured to hold a glass slide having a first width dimension. Moreover, only a portion of the first recessed slide surface and only a portion of the second recessed slide surface combine to define a second recess configured to hold a glass slide having a second width dimension. Furthermore, in one aspect of this embodiment, the entire slide scanning stage rotates about an axis orthogonal to a plane of the recessed slide surfaces to present one of the first recess or second recess for loading of a first glass slide into the respective recess prior to scanning of the first glass slide.

In an embodiment, a digital slide scanning stage includes a base having a fixed arm extending from the base, the fixed arm comprising one or more contact points and a base lower support configured to engage a bottom surface of a glass slide. The scanning stage also includes a rail having a linear axis, the rail extending along the base and a movable arm mounted on the rail, the movable arm extending from the base and comprising one or more contact points and an arm lower support configured to engage a bottom surface of a glass slide. In this embodiment, the movable arm is configured to move along the rail in the linear axis toward the fixed arm and away from the fixed arm and the digital slide scanning stage is configured to bring the fixed arm contact points adjacent a first side edge of a glass slide and control the movable arm to move along the rail in the linear axis toward the fixed arm to engage the movable arm contact points on an opposing side edge of the glass slide and press the first side edge of the glass slide into the fixed arm contact points to secure the slide to the stage. In one aspect of this embodiment, at least one of the movable arm contact points and the fixed arm contact points comprise an angled surface recessed further away from the glass slide at a bottom portion. In another aspect of this embodiment, securing the glass slide between the one or more contact points of the movable arm and the one or more contact points of the fixed arm imparts downward pressure on the glass slide to press at least a portion of the bottom surface of the glass slide into the fixed arm lower support and the movable arm lower support.

Figure 6A:
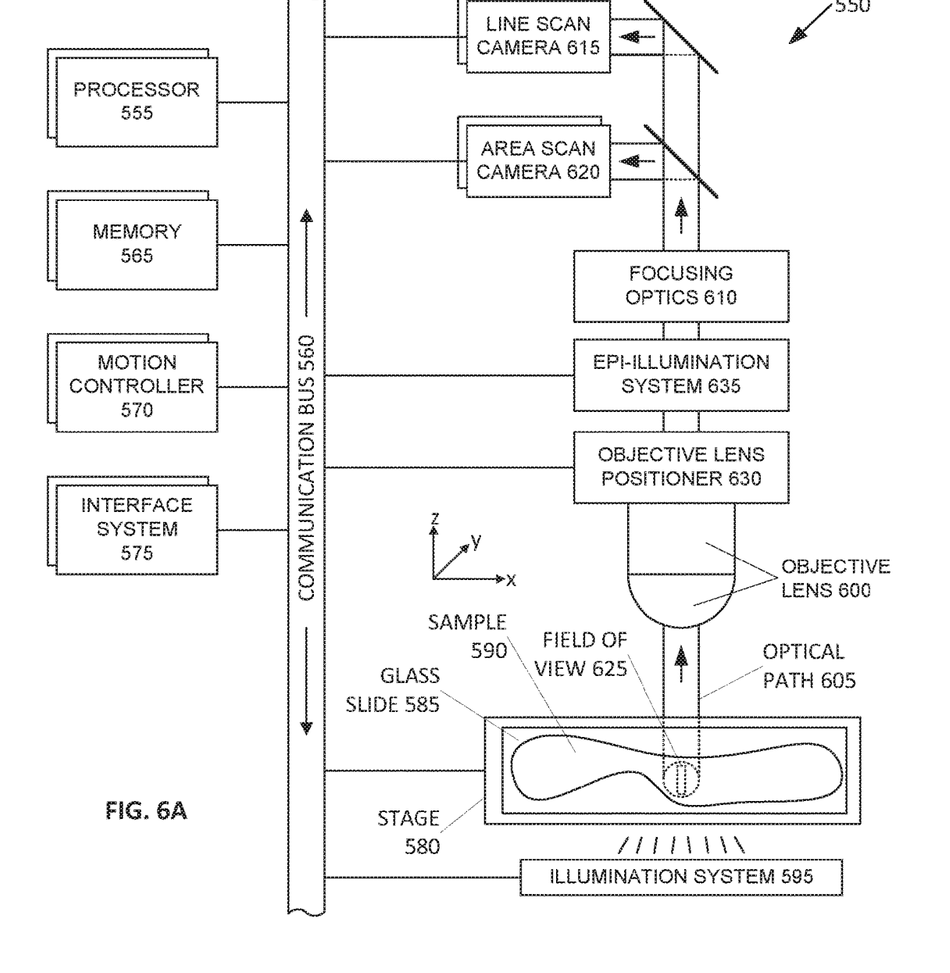
FIG. 6A is a block diagram illustrating an example processor-enabled device that may be used in connection with various embodiments described herein, according to an embodiment.

FIG. 6A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system or a scanning system) that comprises one or more processors 555, one or more memories 565, one or more motion controllers 570, one or more interface systems 575, one or more movable stages 580 (e.g., corresponding to scanning stage 100) that each support one or more glass slides 585 (e.g., corresponding to glass slide 200) with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel, or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), and/or an additional processor for controlling the line scan camera 615, the stage 580, the objective lens 225, and/or a display (not shown). Such additional processors may be separate discrete processors or may be integrated with the processor 555. The one or more processors may be configured to control a motor that alters the position of the scanning stage 100 by moving the stage laterally or rotating the stage. The one or more processors may also control the motor to move one or more inserts 160 to alter the size a recess. The one or more processors may also control the movable arm 150 of the gripper stage to move the movable arm 150 along the rail 190 to secure glass slides of variable width between the contact point(s) 152 of the movable arm 150 and the contact point(s) 142 of the fixed arm 140.

The memory 565 provides storage of data and instructions for programs that can be executed by the processor 555. The memory 565 may include one or more volatile and persistent computer-readable storage mediums that store the data and instructions, including, for example, a random access memory, a read only memory, a hard disk drive, a removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices, such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode, such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64 linear array TDI line scan camera. It should be noted that a variety of bit depths for the line scan camera 615 can be employed for use with a fluorescence scanner embodiment of the scanning system 550.

The movable stage 580 (e.g., corresponding to scanning stage 100) is configured for precise XY movement under control of the processor 555 or the motion controller 570. The movable stage may also be configured for Z movement under control of the processor 555 or the motion controller 570. The moveable stage 585 is configured to position the sample in a desired location during image data capture by the line scan camera 615 and/or the area scan camera 620. The moveable stage 585 is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated XY grid to aid in the location of the sample 590 on the movable stage 580. In an embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50-nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity-corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera 615 may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample.

Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550, either directly or indirectly, for example via a network (not shown).

Figure 6B:
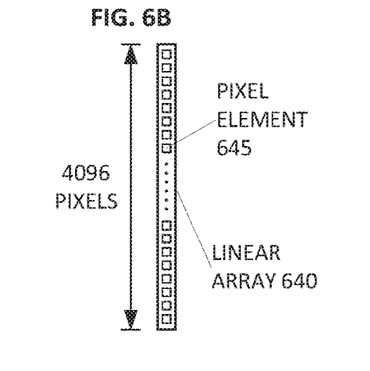
FIG. 6B is a block diagram illustrating an example line scan camera having a single linear array, according to an embodiment.

FIG. 6B illustrates a single linear array 640 of a line scan camera, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figures 6C, 6D:
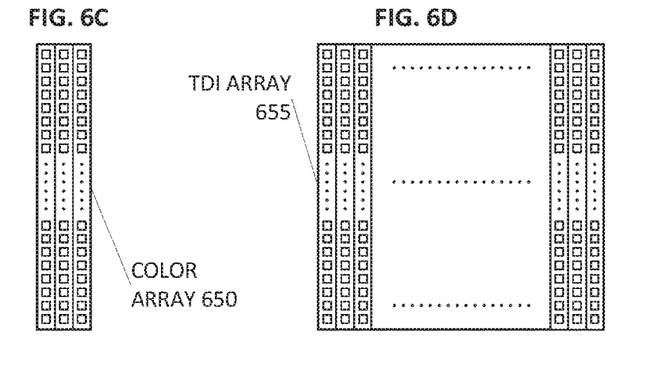
FIG. 6C is a block diagram illustrating an example line scan camera having three linear arrays, according to an embodiment.
FIG. 6D is a block diagram illustrating an example line scan camera having a plurality of linear arrays, according to an embodiment.

FIG. 6C illustrates three linear arrays of a line scan camera, each of which may be implemented as a CCD array. The three linear arrays combine to form a color array 650. In one embodiment, each individual linear array in the color array 650 detects a different color intensity (e.g., red, green, and blue). The color image data from each individual linear array in the color array 650 is combined to form a single field of view 625 of color image data.

FIG. 6D illustrates a plurality of linear arrays of a line scan camera, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:
1. A digital slide-scanning stage comprising:
a base;
a fixed portion comprising a fixed arm extending from the base in a first direction and having a first top surface and a first slide surface recessed below the first top surface by a first side surface, wherein the first slide surface is configured to support a bottom portion of a glass slide; and a movable portion comprising a movable, protruding arm extending in the first direction and having a second top surface and a second slide surface recessed below the second top surface by a second side surface, wherein the second slide surface is configured to support a bottom portion of a glass slide, the protruding arm configured to slide orthogonally to the first direction to change a distance between the fixed arm and the protruding arm;

wherein the second side surface of the movable portion opposes the first side surface of the fixed portion to form a recess above the first and second slide surfaces, and wherein the movable portion is configured to move between at least a first position, having a first distance from the fixed portion, and a second position, having a second distance from the fixed portion, such that, in the first position, the first and second side surfaces and the first and second slide surfaces form a first recess of a first size configured to hold a glass slide having a first width dimension, and, in the second position, the first and second side surfaces and the first and second slide surfaces form a second recess of a second size configured to hold a glass slide having a second width dimension that is different than the first width dimension.

2. The digital slide-scanning stage of claim 1, wherein the fixed arm comprises the first side surface, and wherein the first side surface comprises one or more first contact points configured to contact a side of a glass slide, and wherein the movable, protruding arm comprises the second side surface, and wherein the second side surface comprises one or more second contact points configured to contact a side of a glass slide.

3. The digital slide-scanning stage of claim 2, wherein one or more of the second contact points and the first contact points comprise an angled surface, such that those contact points are configured to contact a glass slide nearer to a top surface of the glass slide than to a bottom surface of the glass slide, to thereby impart downward pressure on the glass slide.

4. The digital slide-scanning stage of claim 1, wherein the base comprises a single rail extending linearly in the second direction, and wherein the movable arm is configured to protrude away from the rail in the first direction and slide along the rail in the second direction.

5. The digital slide-scanning stage of claim 1, wherein the first slide surface and the second slide surface do not adjoin, so as to form an opening, to below the digital slide-scanning stage, between the fixed portion and the movable portion.

6. A digital slide-scanning stage comprising:

a first fixed portion having a first top surface and a first slide surface recessed below the first top surface by a first side surface, wherein the first slide surface is configured to support a bottom portion of a glass slide;

a second fixed portion having a second top surface and a second slide surface recessed below the second top surface by a second side surface, wherein the second slide surface is configured to support a bottom portion of a glass slide; and a third fixed portion having a third top surface, a third slide surface recessed below the third top surface by a third side surface, and a fourth slide surface recessed below the third top surface by a fourth side surface, wherein the third and fourth slide surfaces are each configured to support a bottom portion of a glass slide;

wherein the third side surface of the third fixed portion opposes the first side surface of the first fixed portion to form a first recess, above the first and third slide surfaces, of a first size configured to hold a glass slide having a first width dimension, wherein the fourth side surface of the third fixed portion opposes the second side surface of the second fixed portion to form a second recess, above the second and fourth slide surfaces, of a second size configured to hold a glass slide having a second width dimension that is different than the first width dimension, wherein the digital slide-scanning stage is configured to move between a first position and a second position, wherein, in the first position, the first recess is in a position for scanning, and wherein, in the second position, the second recess is in the position for scanning.

7. The digital slide-scanning stage of claim 6, wherein the first slide surface and the third slide surface do not touch, so as to form an opening, to below the digital slide-scanning stage, below the first recess, and wherein the second slide surface and the fourth slide surface do not touch, so as to form an opening, to below the digital slide-scanning stage, below the second recess.

8. The digital slide-scanning stage of claim 6, wherein the first recess and the second recess are adjacent to each other along a horizontal axis of the digital slide-scanning stage.

9. The digital slide-scanning stage of claim 6, wherein the first recess and the second recess are adjacent to each other along a vertical axis of the digital slide-scanning stage.

10. A digital slide-scanning stage comprising:

a first fixed L-shaped portion having a first top surface and a first slide surface recessed below the first top surface by a first side surface, wherein the first slide surface is configured to support a bottom portion of a glass slide; and a second fixed L-shaped portion having a second top surface and a second slide surface recessed below the second top surface by a second side surface, wherein the second slide surface is configured to support a bottom portion of a glass slide;

wherein the first fixed L-shaped portion and the second fixed L-shaped portion both have first parallel portions, separated by a first distance, so as to form a first recess between their respective side surfaces and above their respective slide surfaces, wherein the first recess is configured to hold a glass slide having a first width dimension, wherein the first fixed L-shaped portion and the second fixed L-shaped portion both have second parallel portions, separated by a second distance that is different than the first distance, so as to form a second recess between their respective side surfaces and above their respective slide surfaces, wherein the second recess is configured to hold a slide having a second width dimension that is different than the first width dimension, wherein the first recess overlaps the second recess, wherein the digital slide-scanning stage is configured to rotate between a first position and a second position, wherein, in the first position, the first recess is in a position for scanning, and wherein, in the second position, the second recess is in the position for scanning.

11. The digital slide-scanning stage of claim 10, wherein the first slide surface and the second slide surface do not touch, so as to form an opening, to below the digital slide-scanning stage, between the first fixed L-shaped portion and the second fixed L-shaped portion.

* * * * *